United States Patent
Gisch et al.

(10) Patent No.: US 9,968,920 B2
(45) Date of Patent: May 15, 2018

(54) STRONG ACID CATALYST COMPOSITION

(71) Applicants: ROHM AND HAAS COMPANY, Philadelphia, PA (US); DOW GLOBAL TECHNOLOGIES LLC, Midland, MI (US)

(72) Inventors: Daryl J. Gisch, Midland, MI (US); William I. Harris, Midland, MI (US); Dennis A. Keeley, Beaverton, MI (US); Marvin K. Tegen, Midland, MI (US); Robert J. Olsen, Lansdale, PA (US); Jose Antonio Trejo-O'Reilly, Lansdale, PA (US)

(73) Assignees: ROHM AND HAAS COMPANY, Philadelphia, PA (US); DOW GLOBAL TECHNOLOGIES LLC, Midland, MI (US)

( * ) Notice: Subject to any disclaimer, the term of this patent is extended or adjusted under 35 U.S.C. 154(b) by 75 days.

(21) Appl. No.: 14/369,338

(22) PCT Filed: Dec. 20, 2012

(86) PCT No.: PCT/US2012/070801
§ 371 (c)(1),
(2) Date: Jun. 27, 2014

(87) PCT Pub. No.: WO2013/101629
PCT Pub. Date: Jul. 4, 2013

(65) Prior Publication Data
US 2015/0011383 A1 Jan. 8, 2015

Related U.S. Application Data

(60) Provisional application No. 61/581,060, filed on Dec. 28, 2011.

(51) Int. Cl.
*B01J 39/05* (2017.01)
*B01J 31/06* (2006.01)
*B01J 39/20* (2006.01)
*B01J 31/08* (2006.01)
*B01J 31/10* (2006.01)
*B01J 31/28* (2006.01)

(52) U.S. Cl.
CPC ........ *B01J 31/06* (2013.01); *B01J 31/08* (2013.01); *B01J 31/10* (2013.01); *B01J 31/28* (2013.01); *B01J 39/05* (2017.01); *B01J 39/20* (2013.01); *B01J 2231/321* (2013.01); *B01J 2231/349* (2013.01); *B01J 2231/49* (2013.01); *B01J 2531/824* (2013.01)

(58) Field of Classification Search
None
See application file for complete search history.

(56) References Cited

U.S. PATENT DOCUMENTS

| | | | | |
|---|---|---|---|---|
| 3,037,052 A | * | 5/1962 | Bortnick | C08F 8/36 521/26 |
| 3,146,213 A | * | 8/1964 | Small | C22B 59/00 521/29 |
| 4,044,059 A | * | 8/1977 | Copelin | C07C 29/141 549/375 |
| 4,179,403 A | * | 12/1979 | Kim | B01J 31/08 502/159 |
| 4,215,011 A | | 7/1980 | Smith, Jr. | |
| 4,416,945 A | * | 11/1983 | Solc | B03C 1/01 428/407 |
| 4,432,968 A | | 2/1984 | Page et al. | |
| 4,571,439 A | | 2/1986 | Keyworth | |
| 5,231,115 A | | 7/1993 | Harris | |
| 5,233,096 A | | 8/1993 | Lundquist | |
| 5,244,926 A | * | 9/1993 | Harris | B01J 20/26 521/148 |
| 5,618,851 A | | 4/1997 | Trochimcznk | |
| 5,663,455 A | | 9/1997 | Harris | |
| 2001/0056130 A1 | * | 12/2001 | Schwarz | C08F 257/02 521/56 |
| 2002/0010079 A1 | * | 1/2002 | Walzer | C08F 10/00 502/117 |
| 2004/0158105 A1 | | 8/2004 | Payne | |
| 2009/0156798 A1 | * | 6/2009 | Vanhoorne | B01J 31/10 536/127 |
| 2011/0124922 A1 | * | 5/2011 | Trejo | B01J 31/10 568/388 |

FOREIGN PATENT DOCUMENTS

| | | |
|---|---|---|
| EP | 466954 A1 | 1/1992 |
| EP | 0486277 A1 | 5/1992 |
| GB | 959514 A | 6/1964 |
| GB | 973555 A | 10/1964 |

(Continued)

OTHER PUBLICATIONS

Ullmann's Encyclopedia of Industrial Chemistry, Dardel et al., Ion Exchangers, pp. 1-8, 2005.*
Bergbreiter, David E.; Li, Chunmei; "Poly(4-tert-butylstyrene) as a Soluble Polymer Support in Homogeneous Catalysis", Organic Letters, 2003, 5(14), pp. 2445-2447.
Gravert, Dennis J.; et.al., "Soluble supports tailored for organic synthesis: parallel polymer synthesis via sequential normal/living free radical processes", JACS, 1998, 120(37), pp. 9481-9495.
Dorfner, Konrad (editor), "Ion Exchangers", Walter de Gruyter publisher, 1991, pp. 983-984.

*Primary Examiner* — Melvin C Mayes
*Assistant Examiner* — Colette Nguyen
(74) *Attorney, Agent, or Firm* — Carl P. Hemenway

(57) ABSTRACT

A catalyst prepared by polymerizing 0-98 weight % butylstyrene; 0-80 weight % vinyl toluene; 1.5-25 weight % divinyl benzene having 1-98 weight % of ethyl vinyl benzene; and 0-80 weight % styrene. Copolymer beads are made, sulfonated, and used as a catalyst.

4 Claims, No Drawings

(56) References Cited

FOREIGN PATENT DOCUMENTS

| | | |
|---|---|---|
| GB | 988623 A | 4/1965 |
| GB | 994137 A | 6/1965 |
| GB | 997290 A | 7/1965 |
| JP | 2010-119995 A | 6/2010 |

* cited by examiner

STRONG ACID CATALYST COMPOSITION

This invention relates to strong acid catalysts prepared from copolymers of alkyl styrene. In particular, this invention relates to catalysts prepared from copolymers butylstyrene and/or vinyl toluene, which is also known as methyl styrene.

Strong acid cation exchange resins are often used as catalysts in various chemical reactions. Many of these resins are based on styrene/divinylbenzene (DVB) copolymers, where the copolymer is sulfonated with sulfuric acid to add sulfonic acid groups to the resin.

For example, GB988,623, EP466954, and U.S. Pat. Nos. 4,571,439 and 4,215,011 disclose the use of a sulfonated copolymer of vinyl toluene (VT)/DVB as a catalyst. However, none of these references discloses strong acid catalysts where the hydrophobic/hydrophilic balance may be controlled.

The invention seeks to provide strong acid catalyst with increased catalytic activity. In a first aspect of the invention, there is provided a catalyst comprising 0-98 weight % butylstyrene; 0-80 weight % vinyl toluene; 1.5-25 weight % divinyl benzene having 1-98 weight % of ethyl vinyl benzene; and 0-80 weight % styrene.

The catalyst is provided as resin beads that are macroporous, gellular, or a combination of both. The term "gel" or "gellular" resin applies to a resin that was synthesized from a very low porosity (0 to 0.1 cm$^3$/g), small average pore size (0 to 17 Angstroms) and low B.E.T. surface area (0 to 10 m$^2$/g) copolymer (measured by the B.E.T. (Brunauer, Emmett and Teller) method).

Preferably, the resin beads are crosslinked, vinylaromatic polymer beads. The formation of crosslinked, vinylaromatic polymer beads by suspension polymerization is well known to those skilled in the art. Formation of such beads containing macroporosity is similarly well known, and several approaches have been disclosed for preparing them.

These beads may be surface functionalized with strongly acidic functional groups to a cation exchange capacity of from 0.1 to 2.5 meq/g. In the case of the gel beads, the surface functionalization is readily understood as functionalization of the outer surface of the beads. In the case of macroporous beads the surface of the bead, as referred to herein, is intended to include the surfaces of the macropores which are internal to the bead itself. This concept of a surface internal to the bead is readily understood by those skilled in the art because macroporous beads are known to possess a surface area much greater than that accounted for by the external surface of the bead, and that additional surface area is understood to be contributed by the internal surfaces of the macropores. It is the polymer forming that internal surface, as well as polymer at the actual outer surface of the bead that is functionalized to produce the macroporous beads.

The terms "surface functionalization" and "surface functionalized" are intended to refer to functionalized polymeric materials with a limited functionality which occurs at or near the surface of the polymer, and is not necessarily restricted to only the surface layer of aromatic nuclei. The depth of functionalization of the surface-functionalized catalyst beads is severely restricted, however, by limiting the functionality to 2.5 meq/g or less, and by functionalizing the beads in a manner that will promote functionalization from the surface inward, so that only the first few layers of aromatic nuclei are functionalized. Such functionalizations are known to those skilled in the art.

Preferred as monomers to be polymerized in making the crosslinked, vinylaromatic polymer beads are vinylaromatic monomers, such as styrene and substituted styrenes, such as butyl styrene, ethyl styrene, and vinyltoluene, vinylnaphthalene and substituted vinylnaphthalenes, and mixtures thereof. The polymer beads that result from polymerizing the monomer or mixture of monomers are crosslinked. This crosslinking comprises introduction into the monomer mixture of crosslinking monomers, that is, those containing more than one polymerizable vinyl group. Preferred are polyvinylaromatic monomers, such as divinylbenzene, trivinylbenzene, divinylnaphthalene and the like, but one or more polyvinylaliphatic monomers may also be present as the crosslinking monomer, as for example ethylene glycol dimethacrylate, trimethylolpropane trimethacrylate and the like. Crosslinking monomers may be introduced at levels from 1 to 35 weight percent of the total monomer. Preferred are polymers made from monomer mixtures containing from 2 to 25 weight percent polyvinylaromatic polymers.

Crosslinking can be augmented by sulfone bridges or other crosslinks that form during functionalization or other post-polymerization reactions. Strongly acidic functional groups useful for functionalizing the vinylaromatic polymer beads to make the catalyst beads include sulfonic and phosphonic acid groups and their respective salts, and preferably the sulfonic acid groups and their salts.

Methods for restricting functionalization to the surface of the polymer are known to those skilled in the art. Most of these depend upon the fact that a functionalizing agent, as for example sulfuric acid, oleum, or chlorosulfonic acid, penetrates polymer beads from the surface at a regular rate, functionalizing aromatic nuclei as it penetrates, to create a shell of relatively uniform thickness in which the aromatic nuclei are largely or entirely functionalized. By proper choice of conditions, including the functionalizing reagent and whether and which swelling solvents are used, the rate at which the functionalizing agent penetrates and functionalizes the beads is kept slow enough that the penetration depth may be monitored. The functionalization is halted after it has proceeded to the desired depth, which is sufficient to produce a cation exchange capacity of from 0.1 to 2.5 meq/g, by quenching in water or by other methods which will be apparent to those skilled in the art.

Resins that are thermally stable and provide improved performance characteristics, including high selectivity, no or little degradation when used at high temperatures, and little or no reactor corrosion are preferred. Thermal stable resins are preferably chlorinated and tested at temperature ranges of 40 to 200° C.

The resin may have aromatic groups having more than one SO$_3$H moiety per polymeric unit. The resin may be polysulfonated or undersulfonated. The resin may be an interpenetrating polymer network resin, and prepared by sequential monomer addition. In one embodiment, the resin comprises a gellular resin having a particle size of 100 to 2000 microns and a particle size distribution that is Gaussian or Unimodal. If the particle size distribution is Gaussian, approximately 90 percent of the particles have diameters within +/−300 microns of the median particle diameter size. A Unimodal particle size distribution is one in which the cells are of a generally uniform size.

Preferably, the resin is sulfonated in sulfuric acid having an initial acid concentration of 92 to 100 percent. Sulfonation adds a sulfonic acid group to the resin. The sulfuric acid is mixed directly with the beads and the use of a solvent is not necessary, but preferred with gel copolymers. As the acid concentration decreases, the rate of sulfonation also decreases. Sulfonation occurs when the temperature reaches the glass transition temperature of the polymer or polymer/solvent mixture.

The catalyst can also be used in combination with metal impregnation techniques that deliver a bifunctional acid/redox capability that can be used in one stage multireaction systems in batch or continuous reactions. The metals that may be used include palladium (Pd), platinum (Pt), rhodium (Rh), ruthenium (Ru), iridium (Ir), copper (Cu), nickel (Ni), silver (Ag), and gold (Au) in ranges from 0.1-25 weight % based on the dry polymer. An exemplary reaction includes, but is not limited to, aldol condensation/dehydration/reduction that may be used in the synthesis of MIBK from acetone.

The catalyst comprises a copolymer of 0-98 weight % butylstyrene; 0-80 weight % vinyl toluene; 1.5-25 weight % divinyl benzene, 1-98 weight % of ethyl vinyl benzene; and 0-50 weight % styrene. A more preferred range is 5-75 weight % of either butyl- or methylstyrene, or a combination of the two alkylstyrene monomers, in addition to the ethylvinylbenzene coming in with the divinyl benzene. The most preferred range is 10-50 weight % of either monomer or a combination of the alkylstyrene monomers, in addition to the ethylvinyl benzene coming in with the divinyl benzene.

The copolymer may comprise at least 25 weight % butylstyrene, 0 weight % vinyl toluene, and 1.8-25 weight % divinyl benzene. The copolymer may also comprise 0 weight % t-butylstyrene, at least 25 weight % vinyl toluene, and 1.8-25 weight % divinyl benzene. Preferably, the butylstyrene is t-butylstyrene and the vinyl toluene is para-vinyl toluene.

The catalyst is prepared by polymerizing 0-98 weight % butylstyrene, 0-80 weight % vinyl toluene, 1.5-4 weight % divinyl benzene having 1-98 weight % of ethyl vinyl benzene, and 0-80 weight % styrene; making copolymer beads; and sulfonating the copolymer beads. The copolymer beads may be sulfonated with 96%-104% sulfuric acid.

The catalysts of the invention may be used for many different processes, including esterification of free fatty acids and triglycerides, reactions with different dipole movements and solubility parameters, and phenol alkylations with different alcohols. For example, sulfonated tBS/DVB catalyst is useful for the etherification of free fatty acids with ethanol or butanol. A styrene/tBS/DVB catalyst increases activity for the alkylation of phenol with octene.

The following examples are presented to illustrate the invention. In the examples and throughout the specification, the following abbreviations have been used.

%-w is percent by weight;
C is centigrade;
DI is deionized;
DVB is divinyl benzene;
DWC is dry weight capacity in meq/g;
eq is equivalents;
ETBE is ethyltertbutylether;
g is gram;
kg is kilograms;
L is liter;
LHSV is liquid hourly space velocity;
meq is milliequivalents;
MHC is moisture holding capacity;
MIBC is methyl-isobutylcarbinol;
MIBK is methyl isobutyl ketone;
ml is milliliters;
MPa is megapascal;
psi is pounds per square inch;
rpm is rotations per minute;
sccm is square centimeters at normal gas conditions;
t- is tert-;
TMP is trimethyl pentane;
VC is volume capacity in meq/ml;
WC is weight capacity;
WRC is water retention capacity in %; and
WVC is wet volume capacity in meq/ml.

Test Methods

Gas Chromatography (GC) was used to separate volatile components of a mixture. A small amount of the sample to be analyzed was drawn up into a syringe. The syringe needle was placed into a hot injector port of the gas chromatograph, and the sample was injected. The injector is set to a temperature higher than the components' boiling points, so components of the mixture evaporated into the gas phase inside the injector. A carrier gas, such as helium, flowed through the injector and pushed the gaseous components of the sample onto the GC column. It is within the column that separation of the components took place. Molecules partitioned between the carrier gas (the mobile phase) and the high boiling liquid (the stationary phase) within the GC column.

Inductive Coupling Plasma Spectroscopy (ICP), an emission spectroscopy technique for chemical analysis in which the elements that are to be measured are introduced into a high temperature (6,000-8,000 degrees Celsius) Argon plasma, and thereby converted into atomic vapor, was used to measure the level of Pd in the resin. Using an Optima™ ICP-OES 4300 DV spectrometer from PerkinElmer Inc., 0.2 g of oven dried resin at 110° C. for 24 hours was digested with $HNO_3$. The liquid was diluted with deionized water and filtered. Palladium ICP standard solution was used and diluted to different concentrations to make a calibration curve. The result of the measurement for the digested resin diluted solution was used to calculate the %-w Pd in the resin.

EXAMPLES

Example 1: Polymers with Vinyl Toluene

An aqueous suspending mixture of 437.5 grams of DI water, 1.2 grams of 50% NaOH, 1.7 grams of Boric Acid, 8.0 grams of a 20% solution of CATFLOC C (Calgon Corp.), and 0.9 grams of gelatin (CAS number 9000-70-8) was made by dissolving the gelatin in the DI water at 40° C., adding the CATFLOC C solution, NaOH, and the boric acid and stirring until the boric acid was dissolved. The pH of the aqueous solution was adjusted to between 9.7 and 10.0 with 20 weight percent NaOH. The suspending mixture was charged to a stainless steel pressure reactor. An organic phase of a mixture of 154.5 grams of methyl-styrene, 64.2 grams of 63% DVB (DVB-63), 219 grams of porogen (either 2,2,4-trimethyl pentane or methyl-isobutylcarbinol), and 3.0 grams of 75% benzoyl peroxide was added to the pressure reactor, which was then pressurized to 7 psi with nitrogen, and sealed. The agitator speed was adjusted to give an average particle size of 600 microns. After 30 minutes of stirring at 25° C., the reactor was heated to 79° C. over 70 minutes and then held at 79° C. for 135 minutes. After 30 minutes at 79° C., the agitation rate was increased by 25 rpm and held there for the remaining time. After the reaction time was complete and the reactor had cooled to room temperature, it was unsealed and the contents were washed several times with DI water to remove the suspending mixture. The beads were stripped of the porogen by placing the beads and a volume of water twice the volume of the beads in a three necked flask equipped with overhead stirrer and distillation head and heating the stirring mixture quickly to 97° C., then slowly raising the temperature to the boiling point and holding the temperature at the boiling point until no further porogen distilled out. After cooling, the beads were poured into a pan and the excess water was removed using a filter stick. The beads were placed in a drying oven at 50° C. overnight to remove remaining porogen and water. The dry beads were screened and the fraction between 20 and 50 mesh was kept.

Example 2: Polymers with Styrene

In a similar manner to Example 1, polymers were made where styrene replaced some or all of the methyl-styrene. Examples are a) 58.5 grams methyl-styrene and 58.5 grams styrene; b) 29.3 grams of methyl-styrene and 87.8 grams of styrene; and c) 117 gram of styrene.

Example 3: Polymers with t-Butylstyrene

In a similar manner to example 1, polymers were made where tert-butylstyrene replaced the methyl-styrene. Examples are a) 117 grams t-butylstyrene, 48.8 grams of DVB-63, and 166 grams of either porogen; b) 89.3 grams of t-butylstyrene, 27.4 grams of styrene, 48.6 grams of DVB-63, and 166 grams of porogen; and c) 44.8 grams of t-butylstyrene, 72.2 grams styrene, 48.6 grams of DVB-63, and 166 grams of porogen.

Example 4: Polymers with t-Butylstyrene and Styrene

In an another example of polymers containing both t-butylstyrene and styrene, an aqueous phase of 838.5 grams of DI water, 160 grams of a 0.75 weight percent solution of carboxymethyl methyl-cellulose, and 1.6 grams of a 65 weight % solution of sodium dichromate was charged to a stainless steel pressure vessel. An organic phase of 264.9 grams of styrene, 88.3 grams of t-butylstyrene, 146.8 grams of DVB-63, 1.25 grams of a 50 weight % solution of tert-butyl peroctoate, 0.4 grams of tert-butyl perbenzoate, and 500 grams of either 2,2,4-trimethylpentane or methyl isobutylcarbinol was added to the reactor. The reactor was purged of air by pressurizing the reactor with nitrogen to 30 psi and releasing the pressure three times, and the reactor was sealed. The agitation was set to a speed that would give an average particle size of 600 microns. After stirring for 30 minutes at 25° C., the reactor was heated to 80° C. over 120 minutes and held at 80° C. for 720 minutes, then heated to 110° C. over 60 minutes and held at 110 C for 180 minutes before being cooled to room temperature. The resultant beads were washed several times with DI water to remove the suspending mixture. After washing, the beads were placed in a pan and the excess water was removed using a filter stick, and then the beads were placed in a fume hood for several days until the water and porogen had evaporated. The dry beads were screened and the fraction between 20 and 50 mesh was kept.

Example 5: Sulfonation of the Polymer Beads

A three-necked flask equipped with an overhead stirrer and addition funnel was loaded with 50 grams of screened copolymer and 250 ml of 20% Oleum (104% $H_2SO_4$) at room temperature. The temperature was raised over about sixty minutes to 120° C., and maintained at that temperature for 180 minutes. The reaction was allowed to cool and then hydrated by a drop-wise addition of water. Typical properties for the sulfonated resins are found in Table 1.

Example 6: Catalyzed Reaction Between Ethanol and Isobutene

A small stainless steel column was filled with a mixture of dried catalyst beads and quartz of similar diameters. The ratio of catalyst to quartz was varied to keep the amount of conversion of the isobutylene to less than 10%. The column was maintained at 60° C. A flow of ethanol was started through the column, and once the temperature and pressure stabilized, the isobutylene was mixed with the ethanol and the formation of ETBE was followed via GC. Relative conversion levels of the isobutylene are found in Table 1.

TABLE 1

| Example | Porogen | WRC/MHC | WVC | DWC | Reactivity ETBE Synthesis |
|---|---|---|---|---|---|
| 1 | MIBC | 46.2 | 2.6 | 5.6 | 67 |
|   | 2,2,4-TMP | 51.3 | 2.3 | 5.6 | 70 |
| 2a | MIBC | 68.2 | 1.33 | 5.4 | 96 |
|    | 2,2,4-TMP | 69.2 | 1.3 | 5.7 | 89 |
| 2b | MIBC | 68.8 | 1.3 | 5.4 | 106 |
|    | 2,2,4-TMP | 73 | 1.2 | 5.5 | 108 |
| 2c | MIBC | 52.1 | 2.11 | 5.33 | 100 |
|    | 2,2,4-TMP | 52.5 | 2.05 | 5.33 |  |
| 3a | MIBC | 72.3 | 1.01 | 4.82 |  |
|    | 2,2,4-TMP | 56 | 1.55 | 4.56 | 25 |
| 3b | MIBC | 67.2 | 1.27 | 4.96 | 49 |
|    | 2,2,4-TMP |  |  |  |  |
| 3c | MIBC | 66.5 | 1.35 | 5.36 |  |
|    | 2,2,4-TMP | 67.7 | 1.17 | 5.29 |  |
| 4 | MIBC | 66.5 | 1.35 | 5.36 |  |
|   | 2,2,4-TMP | 67.6 | 1.26 | 5.07 |  |

Example 7: Esterification of Free Fatty Acids (FFA)

The catalytic lab conversions were carried out in small sealed bottles that were then sealed in larger secondary bottles as the secondary containment. Once the reactants were mixed and the primary and secondary containment bottles sealed, the samples were placed in an Orbital Shaker with heated water bath located in a fume hood. The samples were shaken at 40° C. for 6 hours and then cooled overnight before handling. The bottles were removed from the shaker and inspected while still in the secondary for leaks or breakage. Once they were found to be in a safe condition, the secondary bottles were opened in a fume hood and the primary reactants were inspected. Samples of the reaction mixture were pipetted into sample bottles and labeled for GC analysis of the reaction mixtures. The integration values comparing the percentage of residual free fatty acid found after the reaction and the conversion rate for the esterified product were reported.

Table 3, summarizes the comparative FFA to ester conversion rates for the various resin types as challenged by varied FFA/alcohol pairs. As the base line case, the myristic acid (C-14) and methanol showed essentially no variation in the esterification conversion rate under the conditions applied no matter which strong acid cation resin was applied. But by increasing the chain length of both the FFA to either stearic acid (C-18) or palmitic acid (C-14) and increasing the chain length of the alcohol to ethanol or butanol, variations in the conversion rates for the various resins were measured. Table 2 shows the comparative macroporous cation exchange resins

TABLE 2

| *Type | Sample | WRC % | Capacity meq/ml or g |
|---|---|---|---|
| DOWEX ™ DR-2030 (The Dow Chemical Comp., Midland, MI) | | | 4.7 DWC |
| DOWEX ™ CM-4 (The Dow Chemical Comp., Midland, MI) | | | |
| 3/47 | XUR-1525-L09-032 | 86.2 | 0.5 WVC |
| 6/44 | XUR-1525-L09-033 | 73.4 | 1.0 WVC |
| 8/40 | XUR-1525-L09-034 | 68.8 | 1.2 WVC |
| 8/43 | XUR-1525-L09-035 | 71.5 | 1.0 WVC |

*nominal weight % divinylbenzene/isooctane in organic phase

TABLE 3

| Resin | Resin weight g | FFA weight g | Alcohol ml | Area % FFA | Area % Ester |
|---|---|---|---|---|---|
| | | Stearic Acid, C-18 | Ethanol | | |
| DR-2030 | 0.5 | 3.0 | 25 | 38 | 62 |
| CM-4 | 0.5 | 3.0 | 25 | 54 | 46 |
| 3/47 | 0.5 | 3.0 | 25 | 35 | 65 |
| 6/44 | 0.5 | 3.0 | 25 | 48 | 52 |
| 8/40 | 0.5 | 3.0 | 25 | 58 | 42 |
| 8/43 | 0.5 | 3.0 | 25 | 66 | 34 |
| 2 weight % DVB/tBS (Example 4) | 0.5 | 3.0 | 25 | 19 | 81 |
| Sulfuric Acid Control | | 3.0 | 25 | <1 | 100 |
| | | Stearic Acid, C-18 | Butanol | | |
| DR-2030 | 0.5 | 5.0 | 25 | 43 | 57 |
| CM-4 | 0.5 | 5.0 | 25 | 48 | 52 |
| 3/47 | 0.5 | 5.0 | 25 | 45 | 55 |
| 6/44 | 0.5 | 5.0 | 25 | 59 | 41 |
| 8/40 | 0.5 | 5.0 | 25 | 62 | 38 |
| 8/43 | 0.5 | 5.0 | 25 | 69 | 31 |
| 2 weight % DVB/tBS (Example 4) | 0.5 | 5.0 | 25 | 28 | 72 |
| Sulfuric Acid Control | | 5.0 | 25 | <1 | 99 |
| | | Palmitic Acid, C-16 | Ethanol | | |
| DR-2030 | 0.5 | 3.0 | 25 | 63 | 36 |
| CM-4 | 0.5 | 3.0 | 25 | 58 | 42 |
| 3/47 | 0.5 | 3.0 | 25 | 55 | 45 |
| 6/44 | 0.5 | 3.0 | 25 | 67 | 33 |
| 8/40 | 0.5 | 3.0 | 25 | 75 | 25 |
| 8/43 | 0.5 | 3.0 | 25 | 77 | 23 |
| 2 weight % DVB/tBS (Example 4) | 0.5 | 3.0 | 25 | 32 | 68 |
| Sulfuric Acid Control | 0.5 | 3.0 | 25 | <1 | 99 |
| All Resins | | Myristic Acid, C-14 | Methanol | ≤0.3 | ≥99.7 |

When FFA (stearic, palmitic) was reacted with ethanol or butanol, the 2 weight % DVB/tBS (Example 4) had much higher FFA conversion to esters than the other resins. Only homogeneous sulfuric acid had higher FFA conversion to esters. When myristic acid and methanol were reacted together no significant difference could be seen between catalysts, i.e. the FFA conversion to ester.

Example 8: Improved Thermal Stability

A sample of resin in water was sealed in a stainless steel bomb and heated to 205° C. for 24 hours. After cooling to room temperature, the resin was removed and analyzed for ion exchange capacity and water content. The results from the testing are found in Table 4. Amberlyst™ 35 Wet and Amberlyst™ XE781 were provided from The Dow Chemical Company, Midland, Mich.

TABLE 4

Thermal Stability Testing @205° C./24 hour Hold

| | Before | | | After | | | Change | |
|---|---|---|---|---|---|---|---|---|
| Catalyst | MHC (96) | WC (eq/kg) | VC (eq/L) | MHC (96) | WC (eq/kg) | VC (eq/L) | WC % Loss | VC % Loss |
| Amberlyst 35 Wet | 53.3 | 5.36 | 2.08 | 56.5 | 2.96 | 0.94 | 44.78 | 54.81 |
| Amberlyst XE781 | 55.8 | 2.75 | 0.94 | 57.9 | 2.71 | 0.85 | 1.45 | 9.57 |
| 2a | 51.2 | 5.58 | 2.28 | 56.8 | 3.65 | 1.21 | 34.59 | 46.93 |
| 3c | 67.2 | 4.96 | 1.27 | 63.2 | 4.23 | 1.19 | 14.72 | 6.30 |
| 3b | 56 | 4.56 | 1.55 | 52.8 | 2.00 | 0.69 | 56.14 | 55.48 |

Example 9: tBS/Styrene/DVB Polymer

Polymerizations were conducted in a 1 gallon stainless steel reactor equipped with an agitator and jacket for heating and cooling. An aqueous phase of 712 g DI water, 305 g 1% carboxymethylmethylcellulose, and 1.6 g 60% sodium dichromate was placed in the reactor. A monomer/initiator phase of 800 g t-butylstyrene, 30.3 g 63% divinylbenzene, 2.5 g t-butylperoctoate, and t-butylperbenzoate was placed in the reactor. The monomer/initiator phase was sized by the agitator. The reactor was purged with nitrogen and then sealed. The temperature profile was 80° C. for 15 hours followed by 110° C. for 5 hours. The polymer was washed with DI water and air dried. Additional polymerizations were varying the t-butylstyrene to styrene ratio. The divinylbenzene concentration was kept constant at approximately 2.4 mole percent, and the 80 C reaction time was reduced to 7 hours. Sulfonations were conducted as follows. Fifty g of polymer were placed in glass three necked flask equipped with an agitator and infrared heating lamps. 400 ml of 96 weight % sulfuric acid was placed in the flask and the agitator was started to slurry the polymer. 20 ml of ethylene dichloride was added to the flask and allowed to swell the polymer for 30 minutes. The reactor was gradually heated to 115° C. and held at 115° C. for 2 hours. The reactor was cooled to room temperature and the resin was gradually hydrated with water over 3 hours. The resin was backwashed with DI water and analyzed. As shown in Table 5, the 100% t-butyl styrene resin was not fully sulfonated as shown by unreacted core under microscopic examination.

TABLE 5

Cation Exchange Resin Properties for tBS/Styrene/DVB Polymer

| % t-butyl styrene | % styrene | Mole % DVB | WRC % | DWC meq/g | % Rings Sulfonated | % disubstitution |
|---|---|---|---|---|---|---|
| 100 | 0 | 2.4 | 71.5 | 4.57 | <100* | 14.3* |
| 75 | 25 | 2.4 | 73.8 | 5.02 | 100 | 18.0 |
| 50 | 50 | 2.4 | 72.0 | 5.03 | 100 | 6.3 |
| 25 | 75 | 2.5 | 70.6 | 5.09 | 98.3 | −2.0 |
| 0 | 100 | 2.4 | 75.7 | 5.14 | 91.6 | −8.4 |

*Beads were not sulfonated all the way to the core, but had exchange capacity higher than would be obtained if all the rings in the sulfonated zone were only singly sulfonated.

Example 10: Pd Impregnated t-butylstyrene Sulfonated Resin Catalyst

Macroreticular t-butylstyrene and DVB crosslinked macroreticular sulfonated resin (t-Bu-DVB-Pd) with 14% of crosslinking density was Pd impregnated. The level of Pd in the resin as measured by ICP was 2.0%-w dry basis of the resin.

Example 11: Pd Impregnated Macroreticular Styrenic Sulfonated Resin Catalyst

A comparative strong acid macroreticular styrenic resin at the same level of crosslinker density was Pd impregnated to 2.0%-w Pd dry basis of resin.

Example 12: Methyl Isobutyl Ketone Synthesis Comparative Results

Both resins from Example 10 and Example 11 were packed in a reactor. The reactor was a continuous flow through reactor with 30 ml of resin. The resins were preconditioned with hydrogen for 24 hours at 1 MPa at 100° C. to reduce the Pd to zerovalent metal. The reaction was run for 8 hours by flowing acetone at 1 LHSV ($h^{-1}$) and hydrogen at 200 sccm at a pressure of 2 MPa and temperature of 80° C. Gas chromatography was used to quantify acetone, methyl isobutyl ketone (MIBK), and isopropanol (IPA) molecules. Isopropanol is an unwanted reaction side product and MIBK is the main product of reaction. Acetone conversion, MIBK yield, and selectivities are reported in Table 6.

TABLE 6

| Resin | | Conversion (%) | MIBK Yield (%) | MIBK Selectivity (%) | IPA Selectivity* (%) |
|---|---|---|---|---|---|
| Example 10 | t-Bu-DVB-Pd | 14 | 14 | 98 | 1.2 |
| Example 11 | Sty-DVB-Pd | 12 | 11 | 92 | 6.4 |

(*Selectivity (weight %) is % − molecule produced/total produced molecules in weight % units).

What is claimed is:

1. A catalyst comprising macroporous sulfonated copolymer beads having polymerized monomer units consisting of:
   5-75 weight % of butyl styrene;
   1.5-25 weight % divinyl benzene having 1-98 weight % of ethyl vinyl benzene; and
   0-80 weight % styrene
   wherein the catalyst is not impregnated with metal.

2. The catalyst of claim 1 wherein the butylstyrene comprises at least 10 weight %, and the divinyl benzene comprises 1.8-25 weight % of the catalyst.

3. The catalyst of claim 1 wherein the butylstyrene comprises t-butyl styrene.

4. The catalyst of claim 2 wherein the butylstyrene comprises at least 25 weight %.

* * * * *